United States Patent Office 2,822,393
Patented Feb. 4, 1958

2,822,393

RECOVERY OF CYCLOHEXANONE OXIME

Bernard H. Nicolaisen, Kenmore, and Samuel A. Riccardi, Grand Island, N. Y., assignors to Olin Mathieson Chemical Corporation, a corporation of Virginia No Drawing. Application August 5, 1954
Serial No. 448,139

10 Claims. (Cl. 260—566)

This invention relates to improvements in the manufacture of cyclohexanone oxime. More particularly, the present invention is concerned with a process for the recovery of cyclohexanone oxime from solution in an organic solvent.

In the manufacture of cyclohexanone oxime according to one procedure, nitrocyclohexane in its aci-nitro form is partially reduced to the oxime by means of hydrogen sulfide or other sulfides including, for example, ammonium sulfide, sodium sulfide or sodium hydrosulfide, in an acid, aqueous solution. The oxime is then recovered from the aqueous reaction medium by extraction with a suitable water-immiscible, organic solvent, usually a hydrocarbon solvent, for example, petroleum ether, hexane, heptane, toluene, benzene, or cyclohexane. A particularly advantageous process for the hydrogen sulfide reduction and extraction is described in Bernard H. Nicolaisen and James B. O'Hara application Serial No. 448,088, filed August 5, 1954.

In the sulfide reduction, considerable amounts of sulfur and sulfur compounds are formed. The free sulfur is largely in a finely divided form which is difficult to filter. In addition, organic sulfur compounds of several types appear to be formed as by-products of the reduction. Some of these sulfur compounds are relatively volatile materials and may be distilled overhead with little or no decomposition. Others of these compounds are solids which precipitate during processing in the form of filterable solids. Still others may be obtained as resinous compositions of high sulfur content. These sulfur compounds or their precursors to a large extent are extracted with the oxime from the aqueous reduction medium and are in solution with the oxime in the extracting solvent. The extract also contains cyclohexanol, cyclohexanone and unreacted nitrocyclohexane. The recovery of cyclohexanone oxime is difficult because of the numerous components present in the extract.

Solutions of the oxime in other solvents, for example, cyclohexanone and nitrocyclohexane, are suitable for use in the process of the present invention. For example, cyclohexanone oxime can be prepared by the interaction of cyclohexanone with hydroxylamine hydrochloride or sulfate in the presence of an inorganic base such as caustic or sodium carbonate. At room temperature the oxime precipitates as a solid which can be removed by filtration and, for the purposes of the present invention, taken up in a suitable solvent such as cyclohexane, petroleum ether or benzene. Alternatively, the slurry of precipitated oxime in water can be extracted with the organic solvent and the extract treated according to the process of the present invention. Solutions of sodium hydroxylaminedisulfonate, prepared from sodium nitrite and sodium bisulfite, or hydroxylamine-O-sulfonic acid can be substituted for the hydroxylamine salt. Cyclohexanone oxime can also be produced by the reduction of nitrocyclohexane with zinc dust and acetic acid. The reduction mixture can be neutralized and extracted with a suitable organic solvent to produce a solution suitable for use according to the present invention. Catalytic hydrogenation of nitrocyclohexane, for example, by the process of U. S. Patent 2,638,482, produces cyclohexanone oxime. In this process ammonia is used as a source of hydrogen. The reduction mixture can be evaporated and the residue taken up in benzene, cyclohexanone or unreacted nitrocyclohexane. Any of these solutions of the oxime are suitable for use according to the process of the present invention. Solutions of cyclohexanone oxime can also be obtained by extracting the hydrogenation products of nitrocyclohexane where hydrogen itself is used as the reducing agent. These hydrogenations can also be carried out in cyclohexane or other solvents to provide solutions suitable for use according to the present invention.

The separation of the cyclohexanone oxime from solution in an organic solvent in sufficiently pure condition for further use, especially for rearrangement to caprolactam, is the primary purpose of the present invention. In addition, it is advantageous when the oxime is obtained by reduction of nitrocyclohexane, to recover unreacted nitrocyclohexane in order to recycle it to the reduction step for eventual conversion to oxime. To be economical it is further desirable to recover and recycle any solvents used in the process. It is a further difficulty in the recovery of the oxime from the organic extract that in the presence of water, especially acidic solutions and especially at temperatures above 30° C. and up to 100° C., hydrolysis of oxime proceeds rapidly and yields of the product are markedly reduced. The oxime is hydrolyzed primarily to cyclohexanone and hydroxylamine which add to the difficulty of separating purified oxime. Also, in commercial processing it is difficult to avoid metallic contamination of the oxime due to corrosion of equipment, and it is advantageous to remove these contaminants before the oxime is satisfactory for further treatment.

The present invention provides a method for processing such extracts for the recovery in high yields of the oxime, substantially free from objectionable sulfur, sulfur compounds, metallic compounds, and other by-products, and for the recovery of unreacted nitrocyclohexane for recycle. Generally, the present invention comprises transferring the oxime from the extracting solvent to an aqueous phase by treating with a dilute, aqueous, strong mineral acid to convert the oxime to a water-soluble salt of the acid with subsequent recovery of the oxime from the aqueous solution by neutralization of the aqueous phase with a suitable base to a pH of about 4.5 to 7.5 in the presence of a water-immiscible organic solvent. The oxime is then utilized in solution in the resulting organic extract or separated therefrom for further processing.

In the initial step of this process, cyclohexanone oxime in solution in a water immiscible organic solvent, which may conveniently be identified as the first organic solvent, is converted to a water-soluble salt by means of extraction with a dilute, aqueous, strong mineral acid. The oxime in the form of its salt dissolves in the aqueous acid while nitrocyclohexane and, when the oxime was produced by a sulfide reduction, part of the by-product sulfur compounds remain in the organic layer. Considerable proportions of the sulfur-containing components also dissolve in the aqueous phase; however substantial purification of the oxime is effected in this operation.

In the acid extraction any dilute, aqueous, strong mineral acid can be used, e. g. sulfuric, hydrochloric, or phosphoric acids may be employed. Sulfuric acid is preferred because it is readily available at low cost and is effective. In addition, the resulting cyclohexanone oxime sulfate is readily soluble in water and is thoroughly extracted in a single treatment. The concentration of the mineral acid utilized can be between about 5 and 50% based upon the total weight of the water and acid. Substantially lower concentrations increase the probability of hydrolysis and lower the productive capacity of equipment. Acid having a concentration of about 10 to 20% $H_2SO_4$ is particularly advantageous in avoiding hydrolysis and in providing a relatively large amount of diluent water for heat absorption to aid in temperature control.

Following the initial acid treatment of the present process, the aqueous acid extract containing the oxime in solution as a salt is treated promptly for recovery of the oxime. In this step a water-immiscible organic solvent, conveniently identified as the second organic solvent, is added and the mixture is neutralized by the addition of ammonia to a pH of about 4.5 to 7.5. Oxime is liberated from its salt and passes into the organic layer where it is removed from contact with large proportions of water and thus is not subject to hydrolysis. Also, in this step of the process most of the sulfur compounds, if present, which were extracted by the acid in the initial treatment, remain in the aqueous acid and the oxime is further purified in this respect. Iron or other metallic contaminants are precipitated and are readily removed by any suitable means, e. g. simple filtration or settling of the organic extract. By neutralizing to a pH of about 4.5 to 7.5 and preferably to about 6, the oxime is substantially completely recovered as a solution in the second organic solvent. The amount of organic solvent employed can vary; however, during neutralization there should be enough solvent present at all times to effect solution of the oxime as it is liberated from its water-soluble salt. After removing precipitated metal hydroxides, suitably by filtration, the purified oxime can be recovered by distillation of the second organic solvent or the solution can be used directly, e. g. for rearrangement of the oxime to caprolactam. In either case the recovered solvent can be recycled to the extraction step.

In this neutralization step of our process the use of ammonia as the base to precipitate the free oxime has several advantages. It is low in cost and is easily introduced as gaseous or aqueous ammonia. Its heat of neutralization is less than that of most other bases such as caustic. However, since it is a stronger base than the oxime and a weaker base than cyclohexylamine and other amine by-products of the reduction, it releases the oxime thoroughly from the aqueous solution at a pH of about 4.5 to 7.5 while avoiding precipitation of amine by-products. Furthermore, the metallic impurities precipitate from the mixture and then are removed by suitable means, for example, simple filtration, to produce high quality oxime. Aqueous solutions of other alkalies including the alkali and alkaline earth metal hydroxides and carbonates introduce the danger of over-alkalizing by locally high concentrations of caustic. Means must be provided for removing their high heat of neutralization. When the aqueous solution is properly neutralized with ammonia to a pH of about 6, and filtered, oxime is substantially completely recovered in the form of an organic solution of the oxime.

To recover any remaining oxime in the aqueous layer, it is advantageously re-extracted with a suitable solvent, for example, cyclohexane, to recover as much oxime as possible before discarding the aqueous salt solution. The salt solution is then discharged to waste or worked up for by-product ammonium sulfate. The organic solution of oxime is suitably combined with the principal solution of oxime.

Any water-immiscible organic solvents for the oxime can be used in the preparation of the initial solution or in the extraction of the aqueous salt solution. It is particularly advantageous to use cyclohexane in both extractions since it is relatively low boiling compared with any of the products or intermediates and is readily separated therefrom. This solvent also separates readily from the aqueous solutions and dissolves little water itself. It is further advantageous to utilize the same solvent for the extraction of the crude reduction reaction mixture and for the re-extraction of oxime from the neutralized aqueous solution; however, this is not necessary as different solvents can be used in the separate steps. The use of a common solvent in both extractions eliminates the necessity of multiple solvent recovery systems, stills and other equipment for handling a plurality of solvents. Cyclohexane is usually conveniently available since it is used as starting material for the manufacture of nitrocyclohexane as the first step of an integrated process. Other solvents and preferably hydrocarbons such as benzene, toluene, hexane, heptane or narrow cut low-boiling petroleum fractions can be employed but they do not have the advantageous combination of solvent power, volatility, low solubility for water and low solubility in water of cyclohexane. Cyclohexane is further advantageous in its stability to hot sulfuric acid when it is desired to charge the oxime solution directly to a rearrangement mixture.

The first organic solvent layer derived from the dilute aqueous acid treatment is substantially free from cyclohexanone oxime and is advantageously treated for the recovery of nitrocyclohexane and solvent, both of which can be recycled. Where the oxime solution is obtained by a sulfide reduction of a salt of nitrocyclohexane, the organic solution can be advantageously extracted with aqueous caustic, for example, about 10% NaOH. The aqueous alkaline extract and solvent layers are then separated, for example, in a continuous separator. The alkaline extract of nitrocyclohexane is recycled and can be mixed with the sodium nitrocyclohexane solution obtained by alkaline extraction of the nitration mixture for charging to the reduction operation in the process of Bernard H. Nicolaisen and James B. O'Hara application, Serial No. 448,088.

After separation of the alkaline extract of sodium nitrocyclohexane, the undissolved organic solvent layer is treated for the recovery of solvent and other products. It may be distilled, for example, in a distilling section which may comprise a continuous still, or one or more batch stills. Recovered solvent is advantageously utilized for the extraction of the aqueous salt solution from the oxime precipitation step or for the extraction of the purged reduction liquor of the process of Bernard H. Nicolaisen and James B. O'Hara application, Serial No. 448,088, filed August 5, 1954. Residual sulfur-containing by-products may be discarded.

Where the oxime is obtained by the hydrogenation of nitrocyclohexane and where both the first and second solvents are the same, the organic solution from the aqueous acid extraction can be recycled in whole or in part to the reduction operation. It is sometimes desirable to treat all or a portion of the solution for the separate recovery of nitrocyclohexane and solvent. Where the second solvent is different from the first, separate recovery will be necessary. The nitrocyclohexane can be extracted by caustic as described above and recovered from the caustic extract by acidification. The nitrocyclohexane and solvent can be further purified by distillation or the solution can be separated by distillation without the caustic extraction. Both the nitrocyclohexane and solvent are suitably recycled.

Specific systems for effecting the process of the present invention can take many forms but as an example the process may be performed in the following manner:

The oxime, for example in cyclohexane solvent, obtained by the extraction of the product from the acid aqueous sulfide reduction of nitrocyclohexane usually contains cyclohexanone oxime, unreduced nitrocyclohexane, by product organic sulfur compounds and cyclohexanone. The solution may contain about 10% of cyclohexanone oxime but this amount is not critical. The oxime solution is extracted with dilute aqueous sulfuric acid, for example, about 10% $H_2SO_4$. The operation may comprise thorough mixing and settling in a separator. Alternatively, a continuous counter-current packed extracting column may be used. The solvent, substantially free from oxime but containing other original components of the solution is separated as a supernatant layer and treated for further recovery of its components. The lower layer of aqueous acid solution of cyclohexanone oxime sulfate is separated and transferred to another vessel, suitably a mixer, into which fresh solvent and anhydrous ammonia gas are introduced until the layer reaches a pH of about 6. The heat generated as the sulfuric acid is neutralized raises the temperature of the mixture to about 75° and the oxime dissolves in the solvent. Provision should be made for the removal of excess heat by use of a jacketed kettle or heat exchanger or both. Alternatively the excess heat may be removed by providing for refluxing the cyclohexane or other solvent used. The cooled heterogeneous mixture of cyclohexanone oxime solution and aqueous liquor is transferred to a separator and the supernatant oxime-containing layer is removed. The separated oxime solution after filtration may contain minor proportions of water and salt but it is suitable without further treatment for rearrangement by contact with concentrated sulfuric acid to form caprolactam. Alternatively it may be dried, distilled or otherwise further treated when the oxime is desired as a pure product.

The aqueous salt solution separated from the neutralization operation may contain minor proportions of entrained or dissolved cyclohexanone oxime. It is advantageous therefore to re-extract the aqueous salt solution with an organic solvent to recover the oxime. For example, cyclohexane may be used. The extract can be used as the solvent for extraction of the oxime from the aqueous reduction liquor as described in the process of Bernard H. Nicolaisen and James B. O'Hara application, Serial No. 448,088. Alternatively the extract may be returned to the neutralization vessel. In addition, the separated salt solution may be mixed with the purge or aqueous reduction liquor of the process of that application and both of these materials may be extracted simultaneously before discarding the aqueous portion.

The process of the present invention may be effected continuously or batchwise and is further described in the following specific example which is not to be considered limiting.

*Example*

Cyclohexanone oxime was removed from a cyclohexane extract of a hydrogen sulfide-nitrocyclohexane reduction mixture by extracting with aqueous sulfuric acid. The mixture was pumped to and from a tank to mix the liquids. Oxime solution was charged at the rate of 12 parts per hour, 95% sulfuric acid at 1.6 parts per hour, water at 4.3 parts per hour and recycle ammonium sulfate solution at the rate of 6.3 parts per hour. The contents of the tank overflowed continuously to a decanter separating the oxime-free organic layer and an aqueous oxime sulfate solution. The latter was charged with cyclohexane to a stirred vessel cooled by a water jacket. Anhydrous ammonia was dissolved at the rate of 0.61 part per hour in 2.5 parts per hour of water, cooled and mixed with the oxime sulfate solution. The overflow was separated in a decanter into an aqueous ammonium sulfate solution and a cyclohexane solution. The aqueous stream during most of the run had a pH between 6 and 8, averaging about 6.1. The cyclohexane solution, amounting to about 6.3 parts per hour and containing about 9% of oxime was filtered and charged to a rearrangement operation. The bulk of the aqueous ammonium sulfate solution was recycled to the acid extraction step and a small proportion was extracted to remove any remaining oxime and then discarded. Ammonium sulfate is separated as a by-product from this solution.

We claim:

1. A method for extracting cyclohexanone oxime from solution in a first water immiscible organic hydrocarbon solvent, said solution containing contaminants, which comprises contacting the said solution with a dilute, aqueous, strong mineral acid to form a water soluble salt of the oxime, separating the resulting aqueous phase containing the water soluble salt and neutralizing the separated aqueous phase by the addition of ammonia to a pH of about 4.5 to 7.5 in the presence of a second water immiscible organic hydrocarbon solvent while effecting solution of the oxime in the said second solvent, said solution of oxime in the second solvent being substantially free of said contaminants.

2. The method according to claim 1 in which said second organic solvent is cyclohexane.

3. The method according to claim 1 in which both the first and second organic solvents are cyclohexane.

4. A method for separately recovering cyclohexanone oxime and nitrocyclohexane from solution in a first water immiscible organic hydrocarbon solvent, said solution containing contaminants, which comprises contacting the extract with a dilute, aqueous, strong mineral acid to form a water soluble salt of the oxime, separating the resulting aqueous phase containing the water soluble salt from the non-aqueous phase containing nitrocyclohexane, recovering nitrocyclohexane by caustic extraction from the non-aqueous phase and neutralizing the separated aqueous phase by the addition of ammonia to a pH of about 4.5 to 7.5 in the presence of a second water immiscible organic hydrocarbon solvent while effecting solution of the oxime in the said second organic solvent, said solution of oxime in the second solvent being substantially free of said contaminants.

5. A cyclic and continuous method for separately recovering cyclohexanone oxime and nitrocyclohexane from solution in a first water immiscible organic hydrocarbon solvent, said solution containing contaminants, which comprises contacting the said solution with a dilute, aqueous, strong mineral acid to form a water soluble salt of the oxime, separating the resulting aqueous phase containing the water soluble salt from the non-aqueous phase containing nitrocyclohexane, recovering nitrocyclohexane by caustic extraction from the non-aqueous phase, recycling the caustic extract to a reduction operation effective to form additional cyclohexanone oxime, recycling the first organic solvent to form the solution of cyclohexanone oxime, separating the aqueous acid phase containing the water soluble salt of cyclohexanone oxime and neutralizing the separated aqueous phase by the addition of ammonia to a pH of about 4.5 to 7.5 in the presence of a second water immiscible organic hydrocarbon solvent while effecting solution of oxime in the solvent, said solution of oxime in the second solvent being substantially free of said contaminants, recovering oxime from the second organic solvent and recycling the second organic solvent to the neutralization step.

6. A method for extracting cyclohexanone oxime from a water-immiscible organic hydrocarbon solvent extract of an aqueous sulfide reduction of nitrocyclohexane to cyclohexanone oxime which comprises contacting the extract, said solution containing contaminants, with a dilute, aqueous, strong mineral acid to form a water-soluble salt of the oxime, separating the resultnig aqueous phase containing the water-soluble salt, and neutralizing the separated aqueous phase by the addition of ammonia to a pH of about 4.5 to 7.5 in the presence of a water-immiscible organic hydrocarbon solvent while effecting solution of the oxime in the solvent, said solution of oxime in the second solvent being substantially free of said contaminants.

7. The method according to claim 6 in which said organic solvent in each instance is benzene.

8. The method according to claim 6 in which said organic solvent in each instance is cyclohexane.

9. The method according to claim 6 in which said acid is sulfuric acid.

10. The method according to claim 6 in which said sulfide is hydrogen sulfide.

References Cited in the file of this patent

UNITED STATES PATENTS

| 2,249,177 | Schlack | July 15, 1941 |
| 2,696,505 | Welz | Dec. 7, 1954 |

FOREIGN PATENTS

| 871,031 | France | Apr. 3, 1942 |
| 499,518 | Belgium | Dec. 15, 1950 |